(12) United States Patent
Engel et al.

(10) Patent No.: US 12,083,754 B2
(45) Date of Patent: Sep. 10, 2024

(54) COMPOSITE STRUCTURE

(71) Applicant: Zephyros, Inc., Romeo, MI (US)

(72) Inventors: Marc Engel, Lingolsheim (FR); Jérôme Gillmeth, Eschau (FR)

(73) Assignee: Zephyros, Inc., Romeo, MI (US)

( * ) Notice: Subject to any disclaimer, the term of this patent is extended or adjusted under 35 U.S.C. 154(b) by 625 days.

(21) Appl. No.: 17/277,349

(22) PCT Filed: Oct. 1, 2019

(86) PCT No.: PCT/US2019/053948
§ 371 (c)(1),
(2) Date: Mar. 18, 2021

(87) PCT Pub. No.: WO2020/072412
PCT Pub. Date: Apr. 9, 2020

(65) Prior Publication Data
US 2021/0347132 A1 Nov. 11, 2021

Related U.S. Application Data

(60) Provisional application No. 62/752,599, filed on Oct. 30, 2018, provisional application No. 62/740,604, filed on Oct. 3, 2018.

(51) Int. Cl.
*B29C 70/68* (2006.01)
*B29C 70/06* (2006.01)
(Continued)

(52) U.S. Cl.
CPC .............. *B29C 70/68* (2013.01); *B29C 70/06* (2013.01); *B29K 2677/00* (2013.01);
(Continued)

(58) Field of Classification Search
None
See application file for complete search history.

(56) References Cited

U.S. PATENT DOCUMENTS

| 4,689,258 A | 8/1987 | Slosberg et al. |
| 4,753,837 A | 6/1988 | Hanusa |

(Continued)

FOREIGN PATENT DOCUMENTS

| DE | 3312667 A1 | 10/1984 |
| DE | 3624866 C2 | 1/1988 |

(Continued)

OTHER PUBLICATIONS

International Search Report and Written Opinion for International Application PCT/US2019 53948, mailed on Jan. 24, 2020.

(Continued)

*Primary Examiner* — Arti Singh-Pandey
(74) *Attorney, Agent, or Firm* — The Dobrusin Law Firm, P.C.

(57) ABSTRACT

A composite structure (10) including a fiber injection molded portion (14); an insert material (16); and an optional outer layer (12), where the fiber injection molded portion (14) at least partially surrounds the insert material (16). The present teachings also contemplate a method of forming the composite structure (10), including positioning the insert material (16) into a mold and injecting fibers into the mold by a fiber injection molding process or blow molding process.

16 Claims, 4 Drawing Sheets

(51) Int. Cl.
*B29K 677/00* (2006.01)
*B29L 31/58* (2006.01)

(52) U.S. Cl.
CPC .... *B29K 2713/00* (2013.01); *B29K 2715/003* (2013.01); *B29L 2031/58* (2013.01)

(56) References Cited

U.S. PATENT DOCUMENTS

| | | | |
|---|---|---|---|
| 5,204,170 | A | 4/1993 | Kuyzin |
| 6,568,735 | B1 | 5/2003 | Lohr et al. |
| 7,622,062 | B2 | 11/2009 | Forster |
| 7,807,011 | B2 | 10/2010 | Dunstan et al. |
| 8,828,162 | B2 | 9/2014 | Payras-Carratte et al. |
| 9,108,839 | B2 | 8/2015 | Dijkema et al. |
| 9,157,231 | B2 | 10/2015 | Wingfield et al. |
| 9,624,663 | B2 | 4/2017 | Wingfield |
| 9,644,314 | B2 | 5/2017 | Visscher |
| 9,771,675 | B2 | 9/2017 | Altshuler et al. |
| 2003/0073368 | A1 | 4/2003 | Berkhoff et al. |
| 2003/0176127 | A1 | 9/2003 | McCabe et al. |
| 2004/0053003 | A1 | 3/2004 | Coates et al. |
| 2006/0090958 | A1 | 5/2006 | Coates et al. |
| 2011/0111163 | A1 | 5/2011 | Bozouklian et al. |
| 2011/0123758 | A1 | 5/2011 | Pollaud et al. |
| 2011/0139543 | A1 | 6/2011 | Coates et al. |
| 2011/0268957 | A1 | 11/2011 | Rocher et al. |
| 2011/0293911 | A1 | 12/2011 | Coates et al. |
| 2012/0024626 | A1 | 2/2012 | Coates et al. |
| 2012/0231691 | A1 | 9/2012 | Payras-Carratte et al. |
| 2013/0078439 | A1 | 3/2013 | Katahira |
| 2015/0176164 | A1 | 6/2015 | Lucas |
| 2015/0330001 | A1 | 11/2015 | Coates et al. |
| 2016/0369438 | A1 | 12/2016 | Verschut et al. |
| 2017/0043551 | A1 | 2/2017 | Visscher et al. |
| 2017/0320278 | A1 | 11/2017 | Meeks et al. |
| 2018/0047380 | A1 | 2/2018 | Bush |
| 2018/0126691 | A1 | 5/2018 | Bush et al. |
| 2018/0339491 | A1 | 11/2018 | Hursit et al. |
| 2020/0232133 | A1 | 7/2020 | Bush et al. |
| 2020/0331230 | A1 | 10/2020 | Bush |

FOREIGN PATENT DOCUMENTS

| | | | | |
|---|---|---|---|---|
| DE | 4137310 | A1 | 5/1993 | |
| DE | 102006022846 | A1 | 9/2007 | |
| DE | 102017115912 | A1 | 1/2018 | |
| DE | 102017101128 | A1 | 7/2018 | |
| EP | 0065622 | A1 | 12/1982 | |
| EP | 0286058 | A2 | 10/1988 | |
| EP | 0293612 | A3 | 12/1988 | |
| EP | 2305869 | B1 | 4/2011 | |
| EP | 2497624 | A2 | 9/2012 | |
| EP | 2811818 | B1 | 12/2014 | |
| EP | 3009553 | A1 | 4/2016 | |
| EP | 3351369 | A1 | 7/2018 | |
| ES | 2018993 | A6 | 5/1991 | |
| JP | 2012-106490 | A | 6/2012 | |
| WO | 2014/053505 | A1 | 4/2014 | |
| WO | 2016/087522 | A1 | 6/2016 | |
| WO | 2016/087527 | A1 | 6/2016 | |
| WO | 2017/016547 | A3 | 2/2017 | |
| WO | WO-2018156691 | A1 * | 8/2018 | ........... D04H 1/4209 |

OTHER PUBLICATIONS

Hearing Notice for Oral Proceedings dated Mar. 8, 2024, for Indian Application No. 202137012173.

* cited by examiner

COMPOSITE STRUCTURE

FIELD

The present teachings relate generally to a fibrous composite, and more particularly to a fibrous composite formed at least partially by a blow molding process with integrated technical materials or components.

BACKGROUND

Industry is looking for new ways to provide structural properties, cushioning, insulation, or sound absorption while still having good fire and smoke retardance and physical strength. In a building, vehicle, or aircraft, for example, it is important that the materials used meet fire and flammability standards. Fire and flammability standards are important in establishing building codes, insurance requirements, and the safety of people in the buildings or vehicles. The government also regulates materials used in these buildings, vehicles, and aircrafts. For example, the Federal Aviation Administration requires that interior components, such as passenger seat material, cabinets, interior side wall panels, interior ceilings, partitions, and certain exposed surfaces meet certain flammability standards. The amount of smoke that develops upon exposure of the materials to a flame is also important.

In applications such as seating or cushions, for example, it is important to maintain proper thickness and hardness, even over repeated use, while still being comfortable for the user. It is also desirable to have a lightweight seat or cushion, thereby easing assembly and reducing the weight for the vehicle.

Therefore, there remains a need for a material, or layers thereof, having a higher temperature resistance (e.g., up to about 1150° C.) that is capable of also withstanding handling without degradation or fracturing. There remains a need for materials to be used, for example, in vehicles, aircrafts, or buildings, which meet required flammability, smoke, and/or toxicity standards. There also remains a need for a material that is safe and/or easier to handle (e.g., without the need for certain protective equipment, without the concern of glass contamination in skin, eyes, and lungs, or both). There remains a need for a material that provides thermoacoustic insulation. It is also desired to provide an insulator material having lower (i.e., equal or better) thermal conductivity to provide thermal insulating benefits. It may also be desirable to provide an insulator that is more easily tuned or modified (e.g., during the manufacturing process) to provide the desired thermal insulating characteristics. It, therefore, may also be desirable to provide an insulation material that has more degrees of freedom for tuning. It may also be desirable to provide a material that is easily shaped to form a structure that can fit within a desired or intended space. It may be desirable to have a material that is flexible so the material is capable of bending or conforming around corners and bends in the area to which the material will be installed. It is also desired to have easier installation of the material and reduced chances of material delamination due to stress points in the bend areas. Furthermore, it may be desirable to provide a structure that is capable of providing acoustic characteristics, such as to absorb sound to improve the overall noise levels of a vehicle or aircraft. It may also be desirable to provide a material that dries more quickly or does not retain moisture to reduce or prevent mold or mildew from developing within the material and to reduce or prevent adhesive delamination. It may also be desirable to provide a material that does not degrade over time, thereby extending the life of the material (e.g., as compared to fiberglass). It may also be desirable to provide a flexible material, a lighter weight material, a material made with less toxic or non-toxic materials, a moldable material, or a combination thereof.

SUMMARY

The present teachings meet one or more of the above needs by the improved devices and methods described herein. The present teachings contemplate a composite structure including a fiber injection molded portion and an insert material. The fiber injection molded portion may at least partially surround the insert material. The insert material may include one or more vertically lapped layers, a polyamide-based nonwoven material, a three-dimensional mat with an open structure, a foam material, a heat activatable and/or expandable material, or a combination thereof. An open structure or porous structure of the insert may allow fibers from a fiber injection molding process to pass into and around the insert material. The composite structure may include a plurality of layers forming the insert material. These layers may be the same or different. The composite structure may further include an outer layer. The outer layer may be a fireblocker layer. The composite structure may include one or more brackets, fasteners, or structural reinforcements. The composite structure may be free of added adhesive (e.g., where the fiber injection molding process sufficiently adheres the components of the structure to each other without the need for additional adhesive). The composite structure may include a plurality of fiber injection molded portions having different fiber compositions and/or different densities. The fibers of the fiber injection molded portion may include inorganic fibers. The inorganic fibers may include ceramic fibers and/or silica-based fibers. The composite structure may be a cushion for a seat. The seat may be in a transportation vehicle.

The present teachings also contemplate a method of forming the composite structure, including positioning the insert material into a mold; and injecting fibers into the mold by a fiber injection molding process or blow molding process. The method may further include positioning an outer layer into the mold prior to injecting the fibers. The injecting step may include injecting different fibers in different areas of the mold to create areas of different densities or compositions. The method may further include forming the insert material by a lapping (e.g., vertical lapping) process. The method may include incorporating one or more fasteners, brackets, or structural reinforcements into the composite structure.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Cushioning materials, insulation materials, structural materials, or acoustic absorption materials, such as composite structures, may have a wide range of applications, such as in aviation applications, automotive applications, generator set engine compartments, commercial vehicle engines, in-cab areas, construction equipment, agriculture equipment, architectural applications, flooring, floormat underlayments, and even heating, ventilating and air conditioning (HVAC) applications. These materials may be used for machinery and equipment insulation, motor vehicle insulation, domestic appliance insulation, dishwashers, and commercial wall and ceiling panels. Insulation material may be used in an engine cavity of a vehicle, on the inner and/or outer dash panels, or under the carpeting in the cabin, for example. These materials may also provide other benefits, such as sound absorption, compression resiliency, stiffness, structural properties, temperature or flame resistance, or the like. The insulation material may also serve as a sound attenuation material in an aircraft or a vehicle, attenuating sound originating from outside a cabin and propagating toward the inside of the cabin. The materials as disclosed herein may be useful for aircrafts, such as primary insulation, or interior components of an aircraft, such as the seat cushions. The materials as described herein may be useful for cushioning in aerospace, automotive, commercial vehicles, trains, and other transportation methods. These materials may also be useful in floatation devices, or may have buoyant properties (e.g., in case of the vehicle or aircraft being near water). The materials as disclosed herein may also be useful for filtration, such as hot gas filtration.

The present teachings envision the use of a composite structure that is fire retardant, smoke retardant, safe and/or easier to handle (e.g., without the need for certain items of protective equipment), resilient, compression resistant, buoyant, or any combination thereof. The composite structure may be useful in cushioning applications, including seating. The composite structure may be used for acoustic and/or thermal insulation, for providing compression resistance, for providing a material that reduces or eliminates the possibility of mold or mildew therein. The composite structure may provide long-term structure stability for long-term acoustic and/or thermal performance. The composite structure may provide long-term resistance to humid environments or may be able to withstand temperature and humidity variations and fluctuations.

The present teachings envision a composite structure that meets flame or flammability standards. The composite structure may be located near high temperature radiant heat sources or open flame sources. The composite structure may be shaped to fit within a desired location. The composite structure may be moldable or otherwise shaped. The composite structure may allow for mechanical features to be in-situ molded or allow for fastening or assembly mechanisms to be included. The composite structure may include a plurality of layers or components (e.g., higher density materials, lapped materials, porous limp sheets, fabrics, scrims, facings, films, meshes, adhesives, etc.). The layers may be attached to each other by one or more lamination processes, one or more adhesives, one or more molding processes, or a combination thereof.

The present teachings contemplate a composite structure or composite material including a fiber injection molded portion and one or more insert materials. The composite structure may also include one or more facing layers or other functional layers, which may be referred to herein as an outer layer. The composite structure allows for the introduction and integration of various technical materials or components into a fiber-based blow molding process. The composite structure, and associated methods of forming the material, can be tuned to provide desired properties, such as physical or chemical properties. The resulting tree-dimensional structures may have multifunctional attributes that solve multiple problems. For example, the composite structure may provide compression resistance while also providing cushioning, high temperature resistance, flame resistance or retardance, or a combination thereof.

The composite structure may include one or more fiber injection molded portions. While referred to herein as fiber injection molded portions, this also includes portions formed by one or more blow molding processes. In using fiber injection molding or blow molding processes, this may allow for variations in density in different areas of the composite structure. These processes may also allow for creating a composite structure having a desired shape.

The material fibers that make up a fiber injection molded portion may be chosen based on considerations such as temperature resistance, desired thermal conductivity, stiffness, resiliency, cost, desired resistance to long-term humidity exposure, or the like. The materials forming the fiber injection molded portion may be a blend of fibers. Any of the fibers selected for the fiber injection molded portion may be capable of being blow molded and/or shaped to form a three-dimensional structure. Fibers of differing lengths and/or deniers may be combined to provide desired properties, such as insulation and/or acoustic properties. The fiber length may vary depending on the application; the temperatures to which the composite structure is to be exposed; the desired compression resistance and/or resilience; the insulation properties desired; the acoustic properties desired; the type, dimensions and/or properties of the fibrous material (e.g., density, porosity, desired air flow resistance, thickness, size, shape, and the like of the fiber injection molded portion and/or any other layers of the composite structure); or any combination thereof. The addition of shorter fibers, alone or in combination with longer fibers, may provide for more effective packing of the fibers, which may allow pore size to be more readily controlled in order to achieve desirable characteristics (e.g., acoustic and/or insulation characteristics).

At least some of the fibers forming the fiber injection molded portion may be of an inorganic material. The inorganic material may be any material capable of withstanding temperatures of about 250° C. or greater, about 500° C. or greater, about 750° C. or greater, about 1000° C. or greater. The inorganic material may be a material capable of withstanding temperatures up to about 1200° C. (e.g., up to about 1150° C.). The fibers of the fiber injection molded portion may include a combination of fibers having different melting points. For example, fibers having a melting temperature of about 900° C. may be combined with fibers having a higher melting temperature, such as about 1150° C. When these fibers are heated above the melting temperature of the lower melt temperature fibers (e.g., exceeding 900° C.), the lower melt temperature fibers may melt and bind to the higher temperature fibers. The inorganic fibers may have a limiting oxygen index (LOI) via ASTM D2836 or ISO 4589-2 for example that is indicative of low flame or smoke. The LOI of the inorganic fibers may be higher than the LOI of standard binder fibers. For example, the LOI of standard PET bicomponent fibers may be about 20 to about 23. Therefore, the LOI of the inorganic fibers may be about 23 or greater. The inorganic fibers may have an LOI that is about 25 or greater. The inorganic fibers may be present in the fiber injection molded portion in an amount of about 60 percent by weight or greater, about 70 percent by weight or greater, about 80 percent by weight or greater, or about 90 percent by weight or greater. The inorganic fibers may be present in the fiber injection molded portion in an amount of about 100 percent by weight or less. The inorganic fibers may be selected based on its desired stiffness. The inorganic fibers may be crimped or non-crimped. Non-crimped organic fibers may be used when a fiber with a larger bending modulus (or higher stiffness) is desired. The modulus of the inorganic fiber may determine the size of the loops when the matrix is formed. Where a fiber is needed to bend more easily, a crimped fiber may be used. The inorganic fibers may be ceramic fibers, silica-based fibers, glass fibers, mineral-based fibers, or a combination thereof. Ceramic and/or silica-based fibers may be formed from polysilicic acid (e.g., Sialoxol or Sialoxid), or derivatives of such. For example, the inorganic fibers may be based on an amorphous aluminum oxide containing polysilicic acid. The fibers may include about 99% or less, about 95% or less, or about 92% or less $SiO_2$. The remainder may include —OH (hydroxyl or hydroxy) and/or aluminum oxide groups. Siloxane, silane, and/or silanol may be added or reacted into the fiber injection molded portion to impart additional functionality. These modifiers could include carbon-containing components.

The inorganic fibers of the fiber injection molded portion may have an average linear mass density of about 0.4 denier or greater, about 0.6 denier or greater, or about 0.8 denier or greater. The inorganic fibers of the fiber injection molded portion may have an average linear mass density of about 2.0 denier or less, about 1.7 denier or less, or about 1.5 denier or less. Other fibers of the fiber injection molded portion (e.g., bicomponent binder) may have an average linear mass density of about 1 denier or greater, about 1.5 denier or greater, or about 2 denier or greater. Other fibers of the fiber injection molded portion (e.g., bicomponent binder) may have a linear mass density of about 20 denier or less, about 17 denier or less, or about 15 denier or less. The inorganic fibers of the fiber injection molded portion may have a length of about 20 mm or greater, about 27 mm or greater, or about 34 mm or greater. The inorganic fibers of the fiber injection molded portion may have a length of about 200 mm or less, about 150 mm or less, or about 130 mm or less. A combination of fibers having varying lengths may be used. For example, a combination of about 67 mm and about 100 mm lengths may be used. Varying lengths may be advantageous in some instances, as there may be natural cohesion of the fibers due to the length difference of the fibers, the type of fibers, or both. The blend of fibers of the fiber injection molded portion may have an average denier size of about 4 denier or greater, about 5 denier or greater, or about 6 denier or greater. The blend of fibers of the fiber injection molded portion may have an average denier size of about 10 denier or less, about 8 denier or less, or about 7 denier or less. For example, the average denier size may be about 6.9 denier.

The fiber injection molded portion may include fibers blended with the inorganic fibers. For example, the fiber injection molded portion may also include natural or synthetic fibers. Suitable natural fibers may include cotton, jute, wool, cellulose, glass, silica-based, and ceramic fibers. Suitable synthetic fibers may include polyester, polypropylene, polyethylene, Nylon, aramid, imide, acrylate fibers, or combination thereof. The fiber injection molded portion material may comprise polyester fibers, such as polybutylene terephthalate (PBT), polyethylene terephthalate (PET), and co-polyester/polyester (CoPET/PET) adhesive bi-component fibers. The fibers may include polyacrylonitrile (PAN), oxidized polyacrylonitrile (Ox-PAN, OPAN, or PANOX), olefin, polyamide, polyetherketone (PEK), polyetheretherketone (PEEK), polyethersulfone (PES), or other polymeric fibers. The fibers may be selected for their melting and/or softening temperatures.

The fibers may be 100% virgin fibers, or may contain fibers regenerated from postconsumer waste (for example, up to about 90% fibers regenerated from postconsumer waste or even up to 100% fibers regenerated from postconsumer waste). The fibers may have or may provide improved thermal insulation properties. The fibers may have relatively low thermal conductivity. The fibers may have geometries that are non-circular or non-cylindrical to after convective flows around the fiber to reduce convective heat transfer effects within the three-dimensional structure. The fiber injection molded portion may include or contain engineered aerogel structures to impart additional thermal insulating benefits. The fiber injection molded portion may include or be enriched with pyrolized organic bamboo additives. The fibers blended with the inorganic fibers may be sacrificial upon exposure to certain temperatures. For example, if the fiber injection molded portion is exposed to a temperature of about 250° C. or greater, the fibers may volatilize away, leaving only the inorganic fibers.

The fibers, or at least a portion of the fibers, may have high infrared reflectance or low emissivity. At least some of the fibers may be metallized to provide infrared (IR) radiant heat reflection. To provide heat reflective properties to and/or protect the fiber injection molded portion, the fibers may be metalized. For example, fibers may be aluminized. The fibers themselves may be infrared reflective (e.g., so that an additional metallization or aluminization step may not be necessary). Metallization or aluminization processes can be performed by depositing metal atoms onto the fibers. As an example, aluminization may be established by applying a layer of aluminum atoms to the surface of fibers. Metalizing may be performed prior to the application of any additional layers to the fiber injection molded portion. It is contemplated that other layers of the composite structure may include metallized fibers in addition to, or instead of, having metallized fibers within the fiber injection molded portion.

The metallization may provide a desired reflectivity or emissivity. The metallized fibers may be about 50% IR reflective or more, about 65% IR reflective or more, or about 80% IR reflective or more. The metallized fibers may be about 100% IR reflective or less, about 99% IR reflective or less, or about 98% IR reflective or less. For example, the emissivity range may be about 0.01 or more or about 0.20 or less, or 99% to about 80% IR reflective, respectively. Emissivity may change over time as oil, dirt, degradation, and the like may impact the fibers in the application.

Other coatings may be applied to the fibers, metallized or not, to achieve desired properties. Oleophobic and/or hydrophobic treatments may be added. Flame retardants may be added. A corrosion resistant coating may be applied to the metalized fibers to reduce or protect the metal (e.g., aluminum) from oxidizing and/or losing reflectivity. IR reflective coatings not based on metallization technology may be added.

The fiber injection molded portion may include additional fibers, such as short fibers, which may be, for example, blended with the inorganic fibers. Short fibers, such as binder fibers, may be used (e.g., alone or in combination with other fibers). For example, some or all of the fibers, particularly the binder fibers, may be a powder-like consistency (e.g., with a fiber length of about 2 millimeters to about 3 millimeters, or even smaller, such as about 200 microns or greater or about 500 microns or greater).

The fiber injection molded portion (or any other layer of the composite structure) may include a binder or binder fibers. Binder may be present in the fiber injection molded portion in an amount of about 40 percent by weight or less, about 30 percent by weight or less, about 25 percent by weight or less, or about 15 percent by weight or less. The fiber injection molded portion may be substantially free of binder. The fiber injection molded portion may be entirely free of binder. While referred to herein as fibers, it is also contemplated that the binder could be generally powder-like, spherical, or any shape capable of being received within interstitial spaces between other fibers (e.g., inorganic fibers) and capable of binding the fiber injection molded portion together. The binder may have a softening and/or melting temperature of about 180° C. or greater, about 200° C. or greater, about 225° C. or greater, about 230° C. or greater, or even about 250° C. or greater. The fibers may be high-temperature thermoplastic materials. The fibers may include one or more of polyamideimide (PAI); high-performance polyamide (HPPA), such as Nylons; polyimide (PI); polyketone; polysulfone derivatives; polycyclohexane dimethyl-terephthalate (PCT); fluoropolymers; polyetherimide (PEI); polybenzimidazole (PBI); polyethylene terephthalate (PET); polybutylene terephthalate (PBT); polyphenylene sulfide; syndiotactic polystyrene; polyetherether ketone (PEEK); polyphenylene sulfide (PPS), polyether imide (PEI); and the like. The fiber injection molded portion may include polyacrylate and/or epoxy (e.g., thermoset and/or thermoplastic type) fibers. The fiber injection molded portion may include a multi-binder system. The fiber injection molded portion may include one or more sacrificial binder materials and/or binder materials having a lower melting temperature than the inorganic fibers.

The fiber injection molded portion (or any other layer of the composite structure) may include a plurality of bi-component fibers. The bi-component fibers may act as a binder within the fiber injection molded portion. The bi-component fibers may be a thermoplastic lower melt bi-component fiber. The bi-component fibers may have a lower melting temperature than the other fibers within the mixture (e.g., a lower melting temperature than the inorganic fibers, common staple fibers, or both). The bi-component fiber may be of a flame retardant type (e.g., formed from or including flame retardant polyester). The bi-component fibers may enable the fiber injection molded portion to be molded and/or fused in space as a network so that the material may have structure and body and can be handled, laminated, fabricated, installed as a cut or molded part, or the like to provide insulation properties, acoustic absorption, structural properties, fire retardant properties, smoke retardant properties, low toxicity, or a combination thereof. The bi-component fibers may include a core material and a sheath material around the core material. The sheath material may have a lower melting point than the core material. The web of fibrous material may be formed, at least in part, by heating the material to a temperature to soften the sheath material of at least some of the bi-component fibers. The temperature to which the fiber injection molded portion (or other layer of the composite structure) is heated to soften the sheath material of the bi-component may depend upon the physical properties of the sheath material. Some fibers or parts of the fibers (e.g., the sheath) may be crystalline, or partially crystalline. Some fibers or parts of the fibers (e.g., the sheath) may be amorphous.

For a polyethylene or polypropylene sheath, for example, the temperature may be about 140 degrees C. or greater, about 150 degrees C. or greater, or about 160 degrees C. or greater. The temperature may be about 220 degrees C. or less, about 210 degrees C. or less, or about 200 degrees C. or less. Bi-component fibers having a polyethylene terephthalate (PET) sheath or a polybutylene terephthalate (PBT) sheath, for example, may melt at about 180 degrees C. to about 240 degrees C. (e.g., about 230 degrees C.). The bi-component fibers may be formed of short lengths chopped from extruded bi-component fibers. The bi-component fibers may have a sheath-to-core ratio (in cross-sectional area) of about 15% or more, about 20% or more, or about 25% or more. The bi-component fibers may have a sheath-to-core ratio of about 50% or less, about 40% or less, or about 35% or less.

The fibers of the fiber injection molded portion may be blended or otherwise combined with suitable additives such as other forms of recycled waste, virgin (non-recycled) materials, binders, fillers (e.g., mineral fillers), adhesives, powders, thermoset resins, coloring agents, flame retardants, longer staple fibers, etc., without limitation. Any, a portion, or all of the fibers used in the matrix could be of the low flame and/or smoke emitting type (e.g., for compliance with flame and smoke standards for transportation). Powders or liquids may be incorporated into the fiber injection molded portion that impart additional properties, such as binding, fire/smoke retarding intumescent, expanding polymers that work under heat, induction or radiation, which improves acoustic, physical, thermal, and fire properties.

The fiber injection molded portion may include other materials, instead of or in addition to the other fibers described herein. For example, foam chips (e.g., polyurethane foam chips) or pellets may be used. Expandable or heat-activatable materials are also contemplated.

The composite structure may include one or more insert materials or insert layers (referred to herein as an insert, even when referring to plural layers or materials). The insert may impart additional properties to the composite, such as increased stiffness, compression resistance, resilience, reinforcement, and the like. The insert may include one or more lapped (e.g., vertically lapped) layers, three-dimensional mats with open structures, spacer fabrics, foam, heat activatable and/or expandable material, antimicrobial materials, or layers with open space (e.g., to provide floatation capabilities). The insert may include a treatment, such as with a fire or flame retardant additive to improve performance when exposed to fire, smoke, or toxicity.

The insert may be formed from any of the fibers in any combination as described herein with respect to the fiber injection molded portion. The fibers may be formed into a nonwoven web using nonwoven processes including, for example, blending fibers, carding, lapping, air laying, mechanical formation, or a combination thereof. Through these processes, the fibers may be oriented in a generally vertical direction or near-vertical direction (e.g., in a direction generally perpendicular to the longitudinal axis of the insert). The fibers may be opened and blended using conventional processes. The resulting structure formed may be a lofted insert The lofted insert may be engineered for optimum weight, thickness, physical attributes, thermal conductivity, insulation properties, acoustic absorption, or a combination thereof.

The insert can be adjusted based on the desired properties. For example, the insert may be tuned to provide a desired temperature resistance, weight, thickness, compression resistance, or other physical attributes. The insert may be tuned to provide a desired thermal resistance. The insert may be tuned to provide a desired thermal conductivity. The insert may be tuned to provide desired properties, such as flame or fire retardance, smoke retardance, reduced toxicity, or the like. The insert may be formed from nonwoven fibers. The insert may thus be a nonwoven structure. The insert may be a lofted material. The fibers forming insert may be a unique mixture of vertically or near-vertically oriented fibers. The fibers forming the insert may be a unique mixture of fibers having a generally Z-shape, C-Shape, or S-shape, which may be formed by compressing fibers having a vertical or near-vertically orientation. The fibers may be in a three-dimensional loop structure. The loops may extend through the thickness direction from one surface of the matrix to an opposing surface of the matrix. The fibers forming the insert may have an orientation within about ±60 degrees from vertical, about ±50 degrees from vertical, or about ±45 degrees from vertical. Vertical may be understood to be relative to a plane extending generally transverse from the longitudinal axis of the composite structure (e.g., in the thickness direction). Therefore, a vertical fiber orientation means that the fibers are generally perpendicular to the length of the composite structure (e.g., fibers extending in the thickness direction). The fibers forming the insert may be generally horizontally oriented (e.g., fibers extending in the length and/or width direction). The composite structure may include one or more insert layers. For example, the composite structure may include an insert having fibers that are generally vertically oriented and another insert having fibers that are generally horizontally oriented (e.g., via cross-lapping or air-laying processes).

For example, the insert may have a facing layer on the side of the insert that faces a source of heat. The insert may have a facing layer located on the side of the insert that faces away from a source of heat. The insert may be sandwiched between two (or more) facing layers. A layer (e.g., of a different composition) may be sandwiched between two layers of insert. A facing layer, or an intermediate layer, may be generally coextensive with the side of the insert. The facing layer, or an intermediate layer, may instead cover or be attached to only a portion of a side of the insert. The facings or intermediate layers may include solid films, perforated films, solid foils, perforated foils, woven or nonwoven scrims, or other materials. Facings or intermediate layers may be formed from polybutylene terephthalate (PBT); polyethylene terephthalate (PET), polypropylene (PP), cellulosic materials, or a combination thereof. Facings or intermediate layers may be formed from nonwoven material, woven material, or a combination thereof. The facings or intermediate layers may include silica-based fibers, polysilicic acid fibers, minerals, ceramic, fiberglass, aramids, or a combination thereof. Films may include polyetheretherketone (PEEK), polyethersulfone (PES), polyetherketone (PEK), urethane, polyimide, or a combination thereof. Any of the materials described herein for forming the fiber injection molded portion may be used to form one or more of the facings or intermediate layers as described herein. Fibers forming the facing layer (e.g., if formed as a scrim) or the surface itself may be metallized to impart infrared reflectivity, thus providing an improved thermal insulating value to the overall composite structure. Any of the layers may have a thermal resistance capable of withstanding the temperatures to which the layers will be exposed.

For example, the present teachings contemplate an insert layer (e.g., a lapped insert layer) sandwiched between two layers. One layer may be a film layer (e.g., PEEK film or any other material as described herein for possible fiber materials). On the opposing side of the insert layer may be an air flow resistive layer. This layer may be hydrophobic. This layer may be a spunbond (S) material, a spunbond and meltblown (SM) material, or a spunbond+meltblown+spunbond (SMS) nonwoven material. Such a structure may provide a combination of performance, including a built-in pressure release mechanism to allow the material to acclimate as pressure changes. This may be particularly useful in insulation blankets for aircrafts, as pressure in the cabin changes.

The insert may, for example, include any of the materials as taught or described in U.S. Publication Nos. 2004/0053003 (pertaining to thermoformable sheets), 2006/0090958 (pertaining to a thermoformable product), 2011/0139543 (pertaining to an acoustic material), 2011/0293911 (pertaining to a short fiber nonwoven material), 2012/0024626 (pertaining to a composite sound absorber), 2015/0330001 (pertaining to a moldable short fiber nonwoven material), 2018/0126691 (pertaining to a multi-layer nonwoven material), and 2018/0047380 (pertaining to a nonwoven material having IR reflective fibers); International Application Nos. PCT/US2018/041221 and PCT/US2018/042658 (pertaining to nonwoven structures for use in high temperature applications); and U.S. application Ser. No. 15/988,256 (pertaining to insulation material); all of which are incorporated by reference in their entireties.

The insert may include or be formed from an open three-dimensional structure or foam. This open structure may allow fibers to pass into the structure and around the structure to build the final shape of the composite structure. This may reduce mass while improving resiliency, comfort, impact performance, and the like. This open structure may be a foam, a knit spacer fabric, a three-dimensional knit material, a three-dimensional mat (woven or nonwoven), or the like. An exemplary three-dimensional mat includes an Enkamat® or other Enka® Solutions product, available through Low & Bonar. The open structure, or an insert having open space may also provide or improve buoyancy or floatation of the composite structure.

The insert may include one or more expandable materials. For example, the insert may include heat-activated expandable materials (e.g., in pellet form, adhesive form, in strip form). The expandable material may improve stiffness, compression resiliency/recovery, or both. The expandable material may provide or enhance buoyancy of the composite structure. It is contemplated that the insert could be baked and expanded prior to blow molding. It is also contemplated that the insert could be expanded after or during the blow molding or fiber injection molding process.

The insert may be secured within the composite structure during the molding process. The insert may be removable, which may extend the life of the composite structure or components thereof. For example, if the insert has begun to wear, the insert may be removed, and another insert may be provided to replace it.

The composite structure may include one or more outer layers. The outer layer may cover a portion of the other components of the composite structure. The outer layer may partially enclose a portion of the other components of the composite structure. The outer layer may entirely enclose a portion of the other components of the composite structure. The outer layer may provide additional protection to the composite structure, such as by providing additional flame resistance, puncture resistance, compression resistance. The outer layer may serve as a barrier for moisture or chemicals. The outer layer may act as an insulator. The outer layer may act as a slipcover. The outer layer may be removable. The outer layer may be cleanable or washable (e.g., via spot treating, wiping with a cloth, hand wash, through conventional household or industrial washing machines, or the like). In an event the outer layer becomes worn, torn, damaged, or otherwise requiring replacement, another outer layer may be substituted. The outer layer may, for example, be a fabric, woven layer, fireblocker textile, or nonwoven material. The outer layer may be any facing layer or scrim as described herein. The outer layer may be laid out within the mold during the fiber injection molding or blow molding process. The outer layer may be sufficiently porous that it allows for blow molding of fibers within, on top of, or around the fabric. The outer layer may be formed of a material that repels moisture. The outer layer may be formed of a material that wicks away moisture. The outer layer may be a breathable material. The outer layer may have antimicrobial properties. The outer layer may include one or more features to at least temporarily hold it in place. For example, the outer layer may include one or more fasteners, zippers, hook and loop fasteners, or the like. The outer layer may be secured via one or more adhesives.

The composite structure may include additional features, such as mechanical inserts, braces, structural reinforcements, fasteners, brackets, antimicrobial diffusers, and the like. These features may be secured to the composite structure after formation of the structure. These features may be integrated into the composite structure. For example, an additional feature could be positioned within the mold prior to the blow molding or fiber injection molding process so the feature is incorporated into the final structure. A fastening system may be placed within the mold and the fiber injection molding may occur. This fastening system may allow a seat cushion, for example, to be assembled directly onto a seat frame in a dedicated position. The seat cover may also be directly and immediately secured to the seat cushion.

The configuration of layers within the composite structure is customizable based on the desired properties. One or more inserts may be part of the composite structure. One or more inserts may be removable from the composite structure. One or more inserts may be exchanged with other inserts (e.g., if different properties are required, if the insert has been damaged or loses shape, or if the insert has reached its limit on working life). The composite structure may be free of an outer layer. The composite structure may include one or more outer layers. The outer layer may enclose the fiber injection molded portions and insert material. The fiber injection molded portion may at least partially surround the insert material. The fiber injection molded portion may completely surround the insert material. The outer layer may directly contact the insert. The outer layer may directly contact a fiber injection molded portion. The densities or composition of the fiber injection molded portion may vary at certain areas within the composite structure. The densities or composition of the insert may vary at certain areas within the composite structure. A fiber injection molded portion may be located between two or more insert layers. Two or more insert layers may directly contact each other. A fiber injection molded portion may be located on top of the outer layer (e.g., facing away from the composite structure).

The present teachings also include methods of making the layers of the composite structure, and methods of making the composite structure as a whole. One or more inserts may be formed, at least in part, through a carding process. The carding process may separate tufts of material into individual fibers. During the carding process, the fibers may be aligned in substantially parallel orientation with each other and a carding machine may be used to produce the web.

A carded web may undergo a lapping process to produce a lofted insert. The carded web may be rotary lapped, cross-lapped, or vertically lapped, to form a voluminous or lofted nonwoven material. The carded web may be vertically lapped according to processes such as "Struto" or "V-Lap", for example. This construction provides a web with relative high structural integrity in the direction of the thickness of the insert, thereby minimizing the probability of the web falling apart during application, or in use, and/or providing compression resistance to the composite structure when it is installed and in use. Carding and lapping processes may create a nonwoven fiber layer that has good compression resistance through the vertical cross-section (e.g., through the thickness of the material) and may enable the production of a lower mass insert, especially with lofting to a higher thickness without adding significant amounts of fiber to the insert. The lapped material may have a generally pleated structure. A small amount of hollow conjugate fiber (i.e., in a small percentage) may improve lofting capability and resiliency to improve insulation, sound absorption, or both. Such an arrangement also provides the ability to achieve a low density web with a relatively low bulk density.

The insert may be formed by an air laying process. This air laying process may be employed instead of carding and/or lapping. In an air laying process, fibers are dispersed into a fast-moving air stream, and the fibers are then deposited from a suspended state onto a perforated screen to form a web. The deposition of the fibers may be performed by means of pressure or vacuum, for example. An air laid or mechanically formed web may be produced. The web may then be thermally bonded, air bonded, mechanically consolidated, the like, or combination thereof, to form a cohesive nonwoven insulation material. While air laying processes may provide a generally random orientation of fibers, there may be some fibers having an orientation that is generally in the vertical direction so that resiliency in the thickness direction of the material may be achieved.

The insert may undergo additional processes during its formation. For example, during pleating of the matrix, it is contemplated that the lapped matrix can be in-situ horizontally needled with barbed pusher bar pins. Fibers of the insert (e.g., surface fibers) may be mechanically entangled to tie the fibers together. This may be performed by a rotary tool, with the top of the head having a grit-type finish to grab and twist or entangle the fibers as it spins. The fibers (e.g., the surface of the insert), then, can be entangled in the machine direction (e.g., across the tops of the peaks of the loops after lapping). It is contemplated that these rotating heads of the tool can move in both the x and y directions. The top surface of the insert, the bottom surface of the insert, or both surfaces may undergo the mechanical entanglement. The entanglement may occur simultaneously or at separate times. The process may be performed without binder, with minimal binder, or with a binder of about 40% by weight or less of the web content. The mechanical entanglement may serve to hold the insert together, for example, by tying the peaks of the three-dimensional loops together. This process may be performed without compressing the insert. The resulting surface of the insert may have improved tensile strength and stiffness of the vertical three-dimensional structure. The ability to tie the top surface to the bottom surface may be influenced by the fiber type and length, as well as the lapped structure having an integrated vertical three-dimensional loop structure from top to bottom. The mechanical entanglement process may also allow for mechanically tying fabrics or facings to the top and/or bottom surface of the lapped insert. The surface of the material may instead, or in addition to mechanical entanglement, be melted by an IR heating system, a hot air stream, or a laser beam, for example, to form a skin layer.

The layers of material forming the composite structure may be bonded together to create the finished composite structure. One or more layers may be bonded together by elements present in the layers. For example, the binder fibers in the layers may serve to bond the layers together. The outer layers (i.e., the sheath) of bi-component fibers in one or more layers may soften and/or melt upon the application of heat, which may cause the fibers of the individual layers to adhere to each other and/or to adhere to the fibers of other layers. Layers may be attached together by one or more lamination processes. The layers may be combined by operations such as heat sealing, sonic or vibration welding, pressure welding, the like, or a combination thereof. One or more adhesives may be used to join two or more layers. The adhesives may be a powder or may be applied in strips, sheets, or as a liquid, for example. The vertical three-dimensional structure may enable a facing or other layer to be tied to an insert layer (e.g., mechanically, thermally, or with an adhesive). Because the vertical loop is continuous through the thickness of the structure, the fabric or facing may be tied on the top and the bottom of the structure. One or more layers may be in-situ bonded to the insert. For example, a scrim, with or without adhesive, can be fed through a lapping machine, and the insert can be lapped onto the scrim. The scrim and insert can then be in-situ bonded in the V-lap oven.

The composite structure may be formed by positioning the insert in the mold and performing a fiber injection molding or blow molding process where fibers are injected into a mold. This allows the fibers and the insert material to be joined together. During the fiber injection molding or blow molding process, if the insert has sufficient pore size, it is also contemplated that fibers may be at least partially integrated into the insert, which may provide additional strength to the insert and/or more securely join the insert and the fiber injected molded portion. An outer layer of the composite structure may be secured to the composite structure after it has been formed. The outer layer may instead be positioned within the mold prior to fiber injection molding or blow molding. Upon performing the molding process, the outer layer may become secured or bonded to the fiber injection molded portion, insert material, or both.

During the blow molding or fiber injection molding process, one or more injection nozzles may be used. The nozzles may be placed in different locations. One or more nozzles may be stationary. One or more nozzles may be sliding or rotating. Use of multiple nozzles may allow for creation of areas of differing densities or compositions in the fiber injection molded portions. This may also allow for filling the mold to create a desired shape composite structure. The composite structure or parts thereof (e.g., an outer layer) may be trimmed following the molding process, if necessary.

The composite structure may include one or more layers. The composite structure may include two or more insert layers. The composite structure may include one or more lofted layers, one or more skin layers, one or more facing layers, one or more foils, one or more films, or a combination thereof. The one or more layers may be formed from metals, fibrous material, polymers, or a combination thereof. A skin may be formed by melting a portion of the layer by applying heat in such a way that only a portion of the layer, such as the top surface, melts and then hardens to form a generally smooth surface. The composite structure may include a plurality of layers, some or all of which serve different functions or provide different properties to the composite structure (when compared to other layers of the composite structure). The ability to combine layers of materials having different properties may allow the composite structure to be customized based on the application. The additional layers may function to provide additional insulation properties, protection to the insert or other layers, infrared reflective properties, conductive properties (or reduction of conductive properties), convective properties (or reduction of convective properties), structural properties, or a combination thereof. The one or more layers may be secured to each other or to the insert through molding processes, lamination, heat sealing, sonic or vibration welding, pressure welding, the like, or a combination thereof. The one or more layers may have a temperature resistance that is greater than or equal to the temperature resistance of the binder fibers. The one or more layers may have a melting or softening temperature that is greater than the temperatures to which the layers would be exposed while installed in an assembly. One or more layers may act as a moisture barrier. The one or more layers may be a hydrophobic layer which may have a certain porosity to allow for the composite structure to acclimate to air pressure changes without bursting. Such layer may be especially important in applications such as aerospace insulation. One or more layers may act as a chemical barrier or as a barrier to keep dirt, dust, debris, or other unwanted particles or substances away from the item to be insulated. For example, one or more composite structure layers may provide insulation. One or more composite structure layers may include one or more adhesive materials (e.g., as part of the fibers of the layer or as a separate element in or on the layer) for binding the fibers together, for binding layers together, or both. It is contemplated that any adhesives may be of a type that may melt, flow, bond, re-solidify upon cooling, or a combination thereof. One or more layers, or the composite structure as a whole, may be free of additional adhesives in forming the structure. One or more composite structure layers may support a skin layer, other material layer, or both. One or more composite structure layers may provide heat resistance (e.g., if the composite structure is located in an area that is exposed to high temperatures). One or more composite structure layers may provide stiffness to the composite structure. Additional stiffness, structural properties, compression resistance, compression resiliency, or a combination thereof, may be provided by additional layers (or one or more layers in combination with the one or more inserts). One or more composite structure layers may provide flexibility and/or softness to the composite.

A composite structure or one or more layers thereof (e.g., nonwoven material) may be formed to have a thickness and density selected according to the required physical, insulative, and air permeability properties desired of the finished fibrous layer (and/or the composite structure as a whole). The layers of the composite structure may be any thickness depending on the application, location of installation, shape, fibers used (and the lofting of the insert), or other factors. The density of the layers of the composite structure may depend, in part, on the specific gravity of any additives incorporated into the material comprising the layer (such as nonwoven material), and/or the proportion of the final material that the additives constitute. Bulk density generally is a function of the specific gravity of the fibers and the porosity of the material produced from the fibers, which can be considered to represent the packing density of the fibers.

Any of the fibers or materials as discussed herein, especially with respect to the insert or fiber injection molded portion, may also be employed to form or may be included within any of the additional layers of the composite structure, such as facing layers and/or scrim layers. For example, an inorganic fiber-based paper scrim may be another layer of the structure. Any of the materials described herein may be combined with other materials described herein (e.g., in the same layer or in different layers of the composite structure). The layers may be formed from different materials. Some layers, or all of the layers, may be formed from the same materials, or may include common materials or fibers. The type of materials forming the layers, order of the layers, number of layers, positioning of layers, thickness of layers, or a combination thereof, may be chosen based on the desired properties of each material (e.g., infrared reflectivity, insulation properties, conductive properties, convective properties, compression and/or puncture resistance), the insulation properties of the composite structure as a whole, the heat transfer properties of the composite structure as a whole, the desired air flow resistive properties of the composite structure as a whole, the desired weight, density and/or thickness of the composite structure (e.g., based upon the space available where the fibrous composite will be installed), the desired flexibility of the structure (or locations of controlled flexibility), or a combination thereof. The layers may be selected to provide varying orientations of fibers. One or more composite structure layers may be any material known to exhibit sound absorption characteristics, insulation characteristics, flame retardance, smoke retardance, or a combination thereof. One or more composite structure layers may be at least partially formed as a web of material (e.g., a fibrous web). One or more fibrous composite layers may be formed from nonwoven material, such as short fiber nonwoven materials. One or more fibrous composite layers may be formed from a woven material. One or more fibrous composite layers may be formed by thermally melting the surface of a fiber matrix to form a skin layer. One or more layers may be a fabric, a film, a foil, or a combination thereof. One or more composite structure layers may be a porous bulk absorber (e.g., a lofted porous bulk absorber formed by a carding and/or lapping process). One or more composite structure layers may be formed by air laying. The composite structure (or one or more of the composite structure layers) may be an engineered 3D structure. It is clear from these potential layers that there is great flexibility in creating a material that meets the specific needs of an end user, customer, installer, and the like.

Figure 1A:
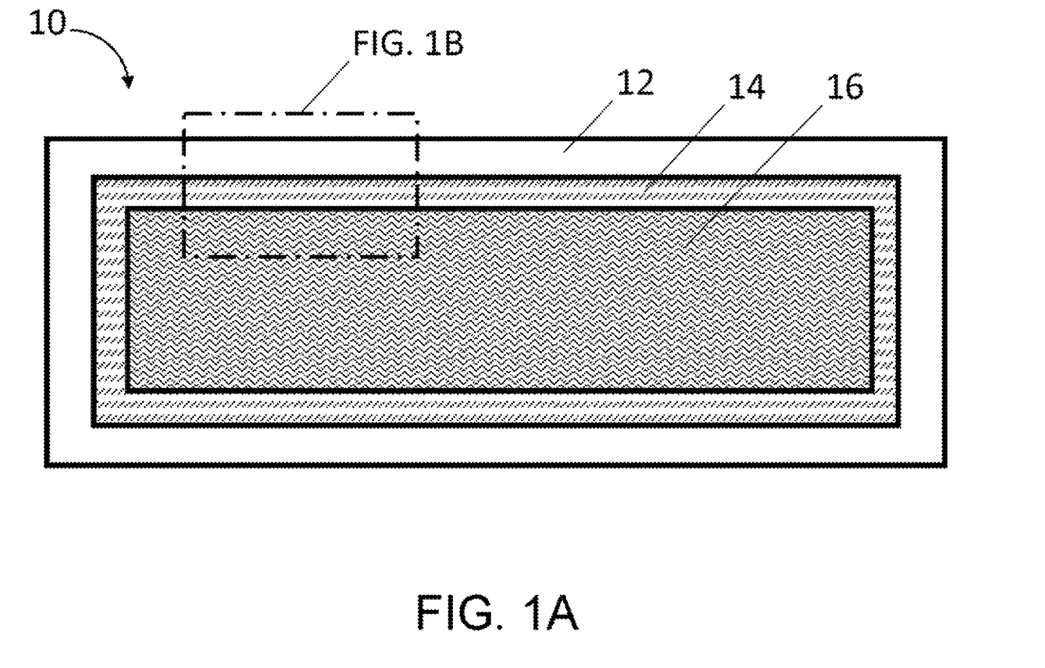
FIG. 1A is a cross-sectional view of an exemplary composite structure in accordance with the present teachings.
Figure 1B:
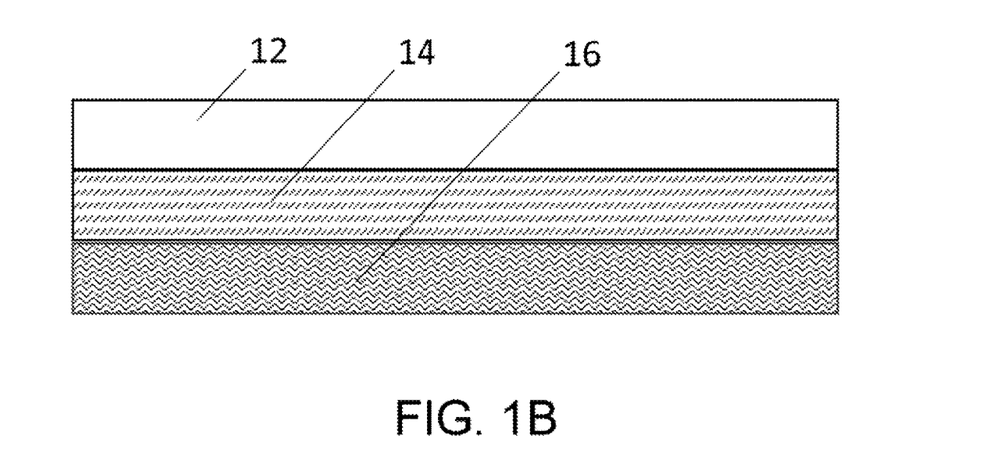
FIG. 1B is an enlarged view of a portion of the composite structure of FIG. 1A.

Turning now to the figures, FIG. 1A illustrates an exemplary composite 10 in accordance with the present teachings. The exemplary composite 10 includes an outer layer 12, a fiber injection molded portion 14, and an insert 16. As illustrated in FIG. 1A, the outer layer 12 encloses the fiber injection molded portion 14, and fiber injection molded portion 14 encloses the insert 16. The portion enclosed within the box defined by dotted lines in FIG. 1A is enlarged in FIG. 1B to illustrate an exemplary configuration of the outer layer 12, fiber injection molded portion 14, and insert 16.

Figure 2A:
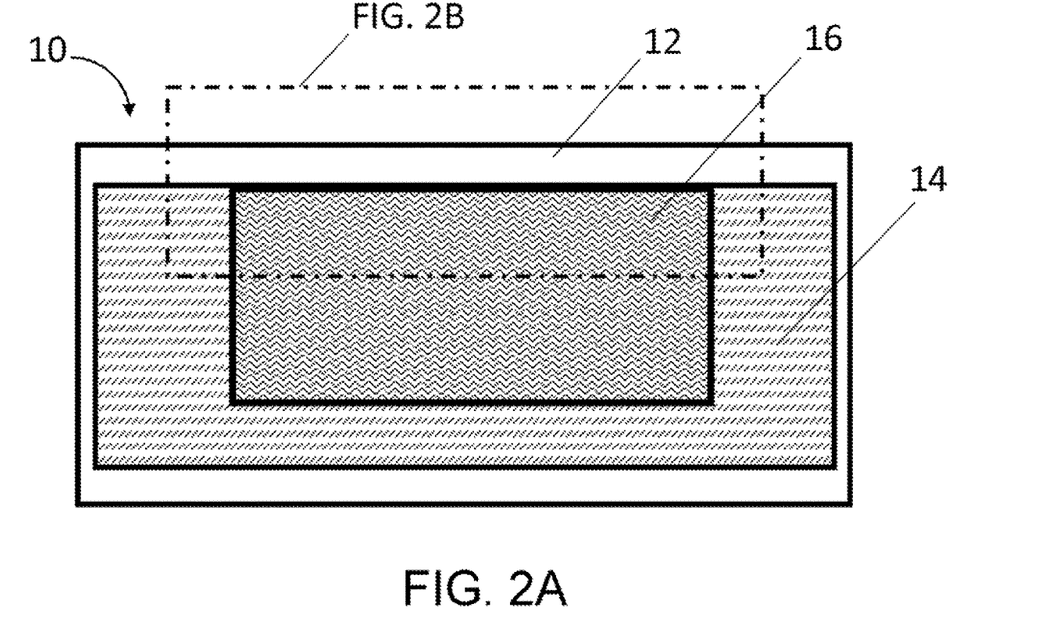
FIG. 2A is a cross-sectional view of an exemplary composite structure in accordance with the present teachings.
Figure 2B:
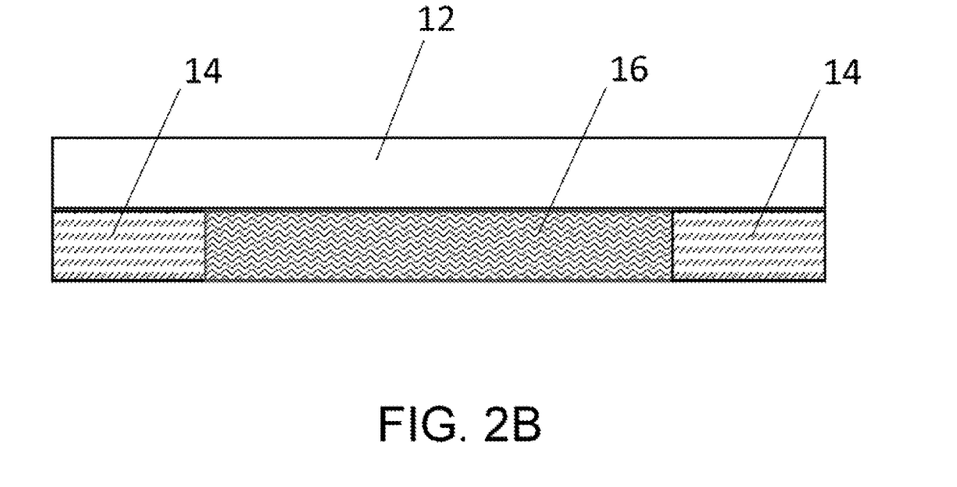
FIG. 2B is an enlarged view of a portion of the composite structure of FIG. 2A.

FIG. 2A illustrates an exemplary composite 10 in accordance with the present teachings. The exemplary composite 10 includes an outer layer 12, a fiber injection molded portion 14, and an insert 16. As illustrated in FIGS. 2A and 2B, the outer layer 12 surrounds the fiber injection molded portion 14 and the insert 16, though the insert 16 is not completely surrounded by or enclosed within the fiber injection molded portion 14. The portion enclosed within the box defined by dotted lines in FIG. 2A is enlarged in FIG. 2B to illustrate an exemplary configuration of the outer layer 12, fiber injection molded portion 14, and insert 16.

Figure 3:
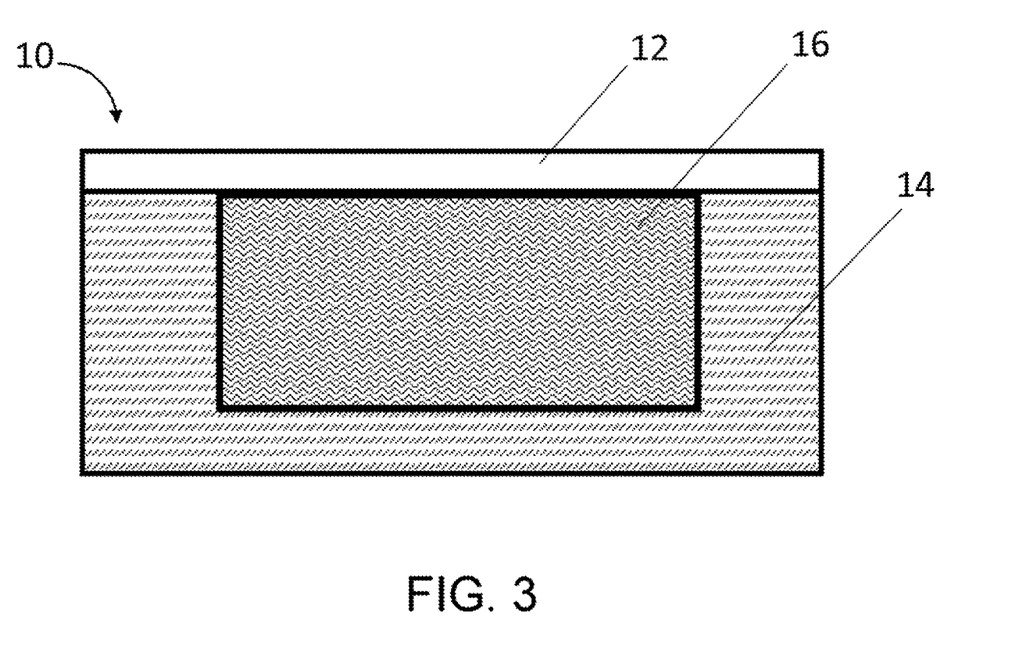
FIG. 3 is a cross-sectional view of an exemplary composite structure in accordance with the present teachings.

FIG. 3 illustrates an exemplary composite 10 in accordance with the present teachings. The exemplary composite 10 includes an outer layer 12, a fiber injection molded portion 14, and an insert 16. As illustrated, the outer layer 12 only covers a portion of the fiber injection molded portion 14 and the insert 16, without fully enclosing these layers.

While FIGS. 1A through 3 illustrate exemplary configurations of the layers or components of the composite structure, other configurations are also contemplated. For example, the outer layer may cover more than one side and less than the entire composite. The figures show the layers or components as rectangles for clarity, though any shape is possible for any of the components. The order of components may be different, or additional layer or components may be added. The insert, for example, may not be entirely enclosed by another component or combination of components. The composite may be free of an outer layer. The insert may include multiple layers. The composite may include multiple inserts, multiple fiber injection molded portions (e.g., formed of different fibers or blends in different areas). The composite may include other features, such as fasteners, reinforcement features, or the like.

Figure 4:
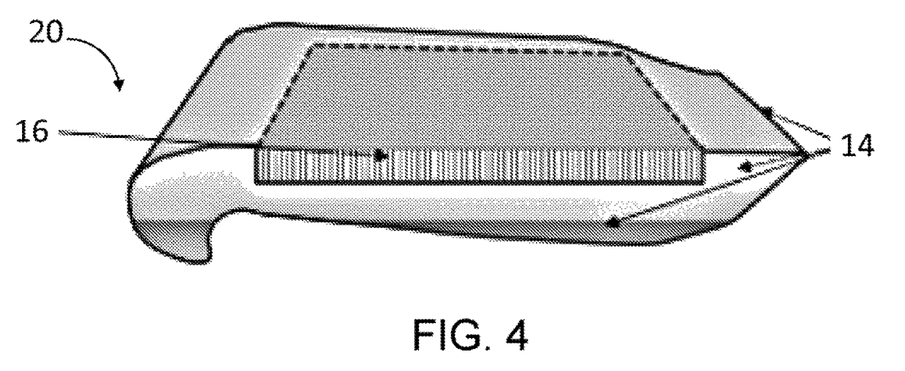
FIG. 4 is an exemplary seat cushion in accordance with the present teachings.

FIG. 4 illustrates an exemplary seat cushion 20. The cushion 20 includes fiber injection molded portions 14, which may be formed of the same fibers or blends or different fibers or blends in different areas. The cushion 20 also includes an insert 16 to provide additional support, cushioning, compression resistance, resilience, or a combination thereof.

Figure 5:
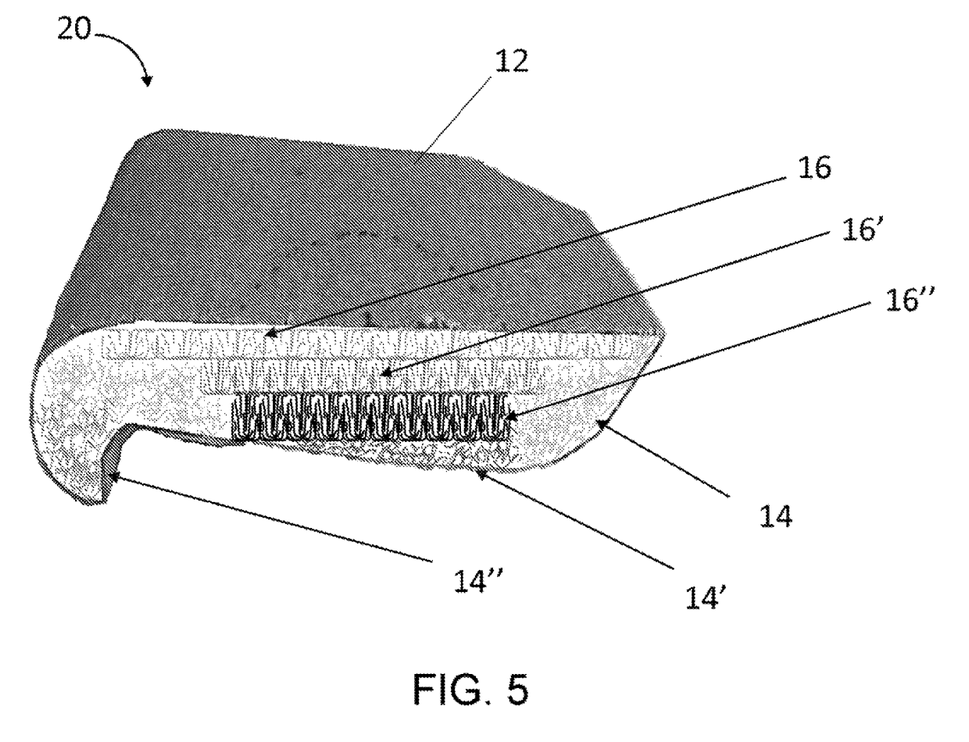
FIG. 5 is an exemplary seat cushion in accordance with the present teachings.

FIG. 5 illustrates an exemplary seat cushion 20. The cushion 20 includes fiber injection portions 14, 14', and 14", which may contain different fiber blends, for example, in different regions of the cushion. This may allow for variations in density or may allow for the cushion to be shaped in a desired three-dimensional shape. The cushion also includes a plurality of insert layers 16, 16', and 16". The different insert layers may be formed of different materials and may be selected to provide different properties to the cushion. The inserts or material blends may allow the cushion to reach the needed cushion performance.

The present teachings also contemplate alternate materials and arrangements of materials. Other or additional materials and processes may be used to provide an article, such as a seat cushion. For example, in addition to or instead of a fiber injected portion, a polymeric material and/or a foam material may be used, such as a polyurethane. The foam may be injection molded. A cavity may be formed within the material (e.g., during injection molding or manually removed afterward). The cavity may be adapted to receive one or more insert materials as described herein. As discussed, the article may include one or more interchangeable parts. The insert material, such as a lapped material, three-dimensional open structure, or other fibrous material, may be manually inserted and replaced (e.g., as a result of wear or deterioration over use). It is contemplated that an outer material may be used to at least partially surround the foam and insert materials. This outer material may be permanently affixed. This outer material may be at least partially removable (e.g., to allow for access to the removable insert material).

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A composite structure comprising:
   a. a fiber injection molded portion; and
   b. an insert material, wherein the insert material includes a lofted three-dimensional fibrous structure;
   wherein the fiber injection molded portion at least partially surrounds the insert material;
   wherein the insert material is removable and/or interchangeable; and
   wherein the composite structure is a cushion for a seat in a transportation vehicle.

2. The composite structure of claim 1, wherein the insert material comprises one or more vertically lapped layers.

3. The composite structure of claim 1, wherein the insert material is a polyamide-based nonwoven material.

4. The composite structure of claim 1, wherein the insert material includes a three-dimensional mat with an open structure.

5. The composite structure of claim 1, wherein the insert material includes a heat activatable and/or expandable material.

6. The composite structure of claim 1, wherein the composite structure includes a plurality of layers forming the insert material.

7. The composite structure of claim 1, wherein the composite structure comprises an outer layer.

8. The composite structure of claim 7, wherein the outer layer is a fireblocker layer.

9. The composite structure of claim 1, wherein the composite structure comprises one or more brackets, fasteners, or structural reinforcements.

10. The composite structure of claim 1, wherein the composite structure includes a plurality of fiber injection molded portions having different fiber compositions and/or different densities.

11. The composite structure of claim 1, wherein fibers of the fiber injection molded portion include inorganic fibers.

12. The composite structure of claim 1, wherein the transportation vehicle is an aircraft.

13. A composite structure comprising:
   a. a fiber injection molded portion; and
   b. an insert material, wherein the insert material includes a lofted three-dimensional fibrous structure and a foam material;
   wherein the fiber injection molded portion at least partially surrounds the insert material; and
   wherein the composite structure is a cushion for a seat in a transportation vehicle.

14. A composite structure of comprising:
   a. a fiber injection molded portion; and
   b. an insert material, wherein the insert material includes a lofted three-dimensional fibrous structure;
   wherein the fiber injection molded portion at least partially surrounds the insert material;
   wherein the composite structure is free of added adhesive; and
   wherein the composite structure is a cushion for a seat in a transportation vehicle.

15. The composite structure of claim 14, wherein the insert material has an open structure, wherein the open structure allows fibers from a fiber injection molding process to pass into and around the insert material.

16. The composite structure of claim 14, wherein the insert material is removable and/or interchangeable.

* * * * *